United States Patent
Raz et al.

(10) Patent No.: US 6,529,515 B1
(45) Date of Patent: Mar. 4, 2003

(54) METHOD AND APPARATUS FOR EFFICIENT NETWORK MANAGEMENT USING AN ACTIVE NETWORK MECHANISM

(75) Inventors: Danny Raz, Aberdeen, NJ (US); Yuval Shavitt, Marlboro, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/409,153

(22) Filed: Sep. 30, 1999

(51) Int. Cl.[7] ............................................. H04L 12/28

(52) U.S. Cl. ...................................... 370/401; 370/396

(58) Field of Search ................................ 370/386, 389, 370/396, 395.31, 395.32, 400, 402, 411, 465, 489, 401

(56) References Cited

U.S. PATENT DOCUMENTS

| | | | | |
|---|---|---|---|---|
| 5,509,123 A | * | 4/1996 | Dobbins et al. | ....... 395/200.15 |
| 5,951,649 A | * | 9/1999 | Dobbins et al. | ............ 709/238 |
| 6,148,411 A | * | 11/2000 | Ichinohe et al. | ............... 714/4 |

OTHER PUBLICATIONS

G. Goldszmidt et al., "Distributed Management by Delegation," 15th International Conference on Distributed Computing Systems, IEEE Computer Society, Vancouver, Canada, pp. 333–340, Jun. 1995.

Y. Yemini et al., "Towards programmable networks," IFIP/IEEE Intl. Workshop on Distributed Systems Operations and Management, pp. 1–11, Apr. 1996.

A.A. Lazar, "Programming telecommunication networks," IEEE Network, 11(5):8–18, Sep./Oct. 1997.

M. Zapf et al., "Decentralised snmp management with mobile agents," Sixth IFIP/IEEE International Symposium on Integrated Network Management, IM'99, pp. 1–13, Boston, MA, May 1999.

(List continued on next page.)

*Primary Examiner*—Wellington Chin
*Assistant Examiner*—Brenda Pham

(57) ABSTRACT

A distributed network management function is implemented in a computer network using a set of active nodes. Each of the active nodes comprises a router and a logically-separate active engine. The router in a given one of the active nodes diverts active packets associated with the network management function to the corresponding active engine for processing. The active engine supports one or more sessions, based at least in part on the active packets, for implementing at least a portion of the network management function. Each of the sessions supported by the active engine corresponds to a particular distributed task to be performed in the network, and has associated therewith a unique network identifier, such that different programs on different network nodes can belong to the same session. The router and active engine at a given one of the nodes may reside on the same machine, or on physically-separate machines.

15 Claims, 7 Drawing Sheets

OTHER PUBLICATIONS

D.L. Tennenhouse et al., "A survey of active network research," IEEE Communications Magazine, 35(1):80–86, Jan. 1997.

AN Working Group, "Architectual framework for active networks," Version 0.9, http://www.cc.gatech.edu/projects/canes/arch/arch–0–9.ps, pp. 1–14, Aug. 1998.

D. Wetherall et al., "ANTS: A toolkit for building and dynamically deploying network protocols," OPENARCH'98, pp. 117–129, Apr. 1998.

A. B. Kulkarni et al., "Implementation of a prototype active network," OPENARCH'98, pp. 130–143, Apr. 1998.

D. Scott Alexander et al., "The Switch Ware active network architecture," IEEE Network, 12(3):29–36, May/Jun. 1998.

S. Bhattatcharjee et al., "An architecture for active network," HPN'97, 15 pages, Apr. 1997.

E. Amir, "An active service framework and its application to real–time multimedia transcoding," SIGCOMM'98, pp. 1–2, Sep. 1998.

D. Decasper et al., "DAN: Distributed code caching for active network," INFOCOM'98, 8 pages, Mar. 1998.

D. Scott Alexander et al., "Active Network Encapsulation Protocol (ANEP)," http://www.cis.upenn.edu/~switchware/ANEP/docs/ANEP.txt, pp. 1–11, 1997.

D.S. Decasper et al., "A Scalable High–Performance Active Network Node," IEEE Network, pp. 8–19, Jan./Feb. 1999.

J.M. Smith et al., "Activating Networks: A Progress Report," IEEE Computer, pp. 32–41, Apr. 1999.

* cited by examiner

```
tishrey 268 act> traceroute shvat
traceroute to shvat (192.180.140.203), 30 hops max, 40 byte packets
  1  heshvan (135.180.142.2)    0.348 ms    0.236 ms    0.219 ms
  2  kislev (135.180.142.10)    0.708 ms    0.624 ms    0.599 ms
  3  razcisco1 (135.180.142.18) 2.620 ms  382.160 ms    7.236 ms
  4  shvat (192.180.140.203)  160.888 ms    4.052 ms    4.196 ms
```

FIG. 6

```
hop 1: Object ID : .1.3.6.1.2.1.1.1.0   (Syntax : Octet)
Value : FreeBSD tishrey.dnrc.bell-labs.com 2.2.2-RELEASE FreeBSD 2.2.2-RELEASE #0
: Mon Feb 23 04:01:12 EST 1998      root@tishrey.dnrc.b hop 2: Object ID : .1.3.6.1.2.1.1.1.0   (Syntax : Octet)
Value : FreeBSD heshvan.dnrc.bell-labs.com 2.2.2-RELEASE FreeBSD 2.2.2-RELEASE #0
: Mon Jun  8 13:15:35 EST 1998      root@heshvan.dnrc.b hop 3: Object ID : .1.3.6.1.2.1.1.1.0   (Syntax : Octet)
Value : FreeBSD kislev.dnrc.bell-labs.com 2.2.2-RELEASE FreeBSD 2.2.2-RELEASE #0
: Thu Dec  3 05:04:35 EST 1998      root@kislev.dnrc.bel hop 4: Object ID : .1.3.6.1.2.1.1.1.0   (Syntax : Octet)
Value : Cisco Internetwork Operating System Software
IOS (tm) 2500 Software (C2500-I-L), Version 11.3(3), RELEASE SOFTWARE (fc1)
Copyright (c) 1986-1998 by Cisco Systems, Inc.
Compiled Mon 20-Apr-98 18:23 by phanguye hop 5: Object ID : .1.3.6.1.2.1.1.1.0   (Syntax : Octet)
Value : FreeBSD shvat.dnrc.bell-labs.com 2.2.2-RELEASE FreeBSD 2.2.2-RELEASE #0
: Wed Dec 23 04:27:46 EST 1998      root@shvat.dnrc.bell-
```

FIG. 7

```
import Act.*;
import OurSnmp.*;
public class capsule
{
        public static void main ( String args[] ) throws Exception {

DatagramPacket  udppacket;
                Act     session = new Act(-9);
                byte[] p = session.getProg();
                byte[] v = session.getInitVars();
                byte[] destip = new byte[4];
                byte[] udpmsg;

// get target IP address
                for (int i=0; i<4; i++) destip[i] = v[i+4];

// get hop number
                int  hopnum = (int) v[8];
                if (v[8]>127) System.out.println("too big.........");
                else v[8]++;

// prepare a new message
                byte[] newpck = new byte[p.length+9];
                for (int i=0; i<p.length; i++) newpck[i] = p[i];
                for (int i=0; i<9; i++) newpck[i+p.length] = v[i];

// send a new message forward
                session.send(newpck,Act.IPaddr(destip));

// get some local status (via SNMP)
                String oid = ".1.3.6.1.2.1.1.5.0";   //host name
                String res1 = OurSnmp.Get(oid);

// send a UDP datagram to report your status
                String udpmsgtext = "hop " + v[8] + ": " + res1;
                session.sendUDP(udpmsgtext, "inbar.dnrc.bell-labs.com", ReportPortNum);

// be nice, report you are done.
                session.killme();
        }
}
```

FIG. 8

```
inbar:try> java UDP
hop 1: Object ID : .1.3.6.1.2.1.4.6.0   (Syntax : Counter32)
Value : 1178310 hop 2: Object ID : .1.3.6.1.2.1.4.6.0   (Syntax : Counter32)
Value : 491882 hop 3: Object ID : .1.3.6.1.2.1.4.6.0   (Syntax : Counter32)
Value : 213 hop 4: Object ID : .1.3.6.1.2.1.4.6.0   (Syntax : Counter32)
Value : 1066733 hop 5: Object ID : .1.3.6.1.2.1.4.6.0   (Syntax : Counter32)
Value : 0 hop 1: Object ID : .1.3.6.1.2.1.4.6.0   (Syntax : Counter32)
Value : 1178361 hop 2: Object ID : .1.3.6.1.2.1.4.6.0   (Syntax : Counter32)
Value : 491911 hop 3: Object ID : .1.3.6.1.2.1.4.6.0   (Syntax : Counter32)
Value : 215 hop 4: Object ID : .1.3.6.1.2.1.4.6.0   (Syntax : Counter32)
Value : 1066771 hop 5: Object ID : .1.3.6.1.2.1.4.6.0   (Syntax : Counter32)
Value : 0
```

FIG. 9

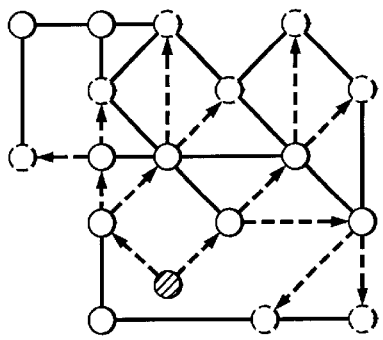

METHOD AND APPARATUS FOR EFFICIENT NETWORK MANAGEMENT USING AN ACTIVE NETWORK MECHANISM

FIELD OF THE INVENTION

The present invention relates generally to computer networks and more particularly to network management techniques for use in computer networks.

BACKGROUND OF THE INVENTION

The emerging next generation of routers for computer networks exhibit not only high performance, but also enhanced functionality, such as support for virtual private networks and quality of service (QoS) guarantees. In order to achieve this functionality, features such as per flow queuing and fast Internet Protocol (IP) filtering are generally incorporated into the router hardware. However, the management of a network comprised of such devices and efficient use of the enhanced functionality introduces many new challenges which are not adequately addressed by existing network management techniques.

The majority of conventional network management systems are typically centralized around some type of management station. In this type of centralized architecture, a manager queries the managed objects, builds a view of the network, and sends alerts if a problem is detected. The manager can also try and take corrective actions by sending configuration commands to network entities.

There are many drawbacks to the above-noted centralized architecture, and these drawbacks generally become more evident as a network grows in size and complexity. For example, as the number of controlled elements increases, the requirements for computational power from the management system and bandwidth from the network that connects it also increase. In addition, in a large network, some of the controlled entities are distant from the management station, such that control loops exhibit long delays, and control traffic wastes bigger portions of the network bandwidth.

In order to alleviate the above-noted scalability problems, various types of distributed control architectures have been proposed in recent years. See, e.g., G. Goldszmidt et al., "Distributed Management by Delegation," 15th International Conference on Distributed Computing Systems," IEEE Computer Society, Vancouver, Canada, June 1995; Y. Yemini et al., "Towards programmable networks," IFIP/IEEE Intl. Workshop on Distributed Systems Operations and Management, October 1996; A. A. Lazar, "Programming telecommunication networks," IEEE Network, 11(5):8–18, September/October 1997; and M. Zapf et al., "Decentralised snmp management with mobile agents," Sixth IFIP/IEEE International Symposium on Integrated Network Management, IM'99, May 1999, Boston, Mass.

Most of these conventional approaches delegate some of the central management tasks to distributed software agents. This is very useful to alleviate the load from the manager, reduce network traffic, and shorten control loops. However, this type of delegation does not support a truly distributed agent system where agents can communicate with their neighbors to efficiently carry out distributed tasks. Such distributed tasks are important in implementing functions such as scalable self-healing in network operations, e.g., local rerouting around congested spots, or cooperated caching.

Many of the above-noted conventional approaches also use a distributed object paradigm that abstracts the implementation details. Abstractions, such as Common Object Request Broker Architecture (CORBA), Distributed Component Object Modeland (DCOM), Java Remote Method Invocation (RMI), are helpful in designing and building distributed agent systems, but they hide the true cost of the implementation details. As a result, conventional agent-based systems tend to be, in many cases, inefficient in their use of network resources, primarily in their use of bandwidth. These and other conventional network management approaches thus fail to provide efficient distribution of the management task in the network.

Another important issue in distributed agent systems for management and control is the location at which these agents reside. Clearly, this has a major impact on the performance since it effects the delay in the control loop. In general, existing software agent solutions assume the existence of available hosts to run their application-level programs. An optimal location for an agent would be in the router kernel where all the necessary local information is available, and action can be taken locally. However, such a solution has been deemed impractical due to the inability to interfere with router real-time operation constraints. Clearly, the closer the agent is to the controlled system, the better it can perform. Nonetheless, conventional distributed network management approaches have been unable to provide optimal agent location.

It is therefore apparent that a need exists for an improved distributed network management approach which overcomes the problems associated with the above-described conventional approaches.

SUMMARY OF THE INVENTION

The invention provides an active network approach to network management that simplifies the deployment of distributed network management applications in IP networks and other types of computer networks. In an illustrative embodiment of the invention, a distributed network management function is implemented in a computer network using a set of active nodes. Each of the active nodes comprises a router and a logically-separate active engine. In addition to performing conventional forwarding functions, the router in a given one of the active nodes diverts active packets associated with the network management function to the corresponding active engine for processing. The active engine supports one or more sessions, based at least in part on the active packets, for implementing at least a portion of the network management function. Each of the sessions supported by the active engine corresponds to a particular distributed task to be performed in the network, and has associated therewith a unique network identifier, such that different programs on different network nodes can belong to the same session. The router and active engine at a given one of the nodes may reside on the same machine, or on physically-separate machines.

In accordance with another aspect of the invention, the given active node may be configured to support a blind addressing mode. The blind addressing mode may be used to send designated packets from the active node via unspecified network nodes in a particular direction toward a destination node, such that a router in a first unspecified active node along a route to the destination node intercepts the packet and sends it to an associated processing engine of that node. In this manner, the active node can communicate with other active nodes of the network without knowing their specific addresses or locations.

Examples of network management functions that may be implemented using the active network approach of the invention include collect-en-route and report-en-route information gathering programs, and message dissemination applications with ad-hoc definition of a particular group of message receivers.

By utilizing active network techniques to distribute and execute network management applications, the invention provides efficient use of network resources, without increasing the complexity of application development. Advantageously, a computer network configured in accordance with the invention enables the safe execution and rapid deployment of new distributed management applications in a network layer. This active network approach can be gradually integrated into, e.g., an otherwise conventional IP network, and allows smooth migration from conventional IP to programmable networks.

BRIEF DESCRIPTION OF THE DRAWINGS

FIGS. 5(A), 5(B) and 5(C) illustrate three different route tracing executions that may be implemented in the FIG. 3 network.

FIG. 6 shows an example of a router identifier report generated in accordance with the invention.

FIG. 7 shows an example set of active packet code that implements data collection along a particular path in a network in accordance with the invention.

FIG. 8 shows an example of a report generated by an active data collection program for an IP forwarding counter in accordance with the invention.

FIG. 9 shows an example of a binary balanced dissemination tree utilized in a message dissemination application of the invention.

DETAILED DESCRIPTION OF THE INVENTION

The present invention will be illustrated below in conjunction with an exemplary computer communication network configured to utilize the Internet Protocol (IP) standard. It should be understood, however, that the invention is not limited to use with any particular type of network or network communication protocol. The disclosed techniques are suitable for use with a wide variety of other networks and protocols.

The invention in an illustrative embodiment provides a computer network architecture that simplifies the deployment of distributed network management applications in IP networks and other types of computer networks. As will be described in greater detail below, the invention makes use of so-called active network techniques, as described in, e.g., D. L. Tennenhouse et al., "A survey of active network research," IEEE Communications Magazine, 35(1):80–86, January 1997, to provide a framework which allows the efficient distribution and execution of network management applications in a set of network routers. By utilizing active network techniques to distribute and execute network management applications, the invention provides efficient use of network resources, without increasing the complexity of application development. Advantageously, a computer network configured in accordance with the invention enables the safe execution and rapid deployment of new distributed management applications in a network layer. This active network approach can be gradually integrated into, e.g., an otherwise conventional IP network, and allows smooth migration from conventional IP to programmable networks.

Figure 1:
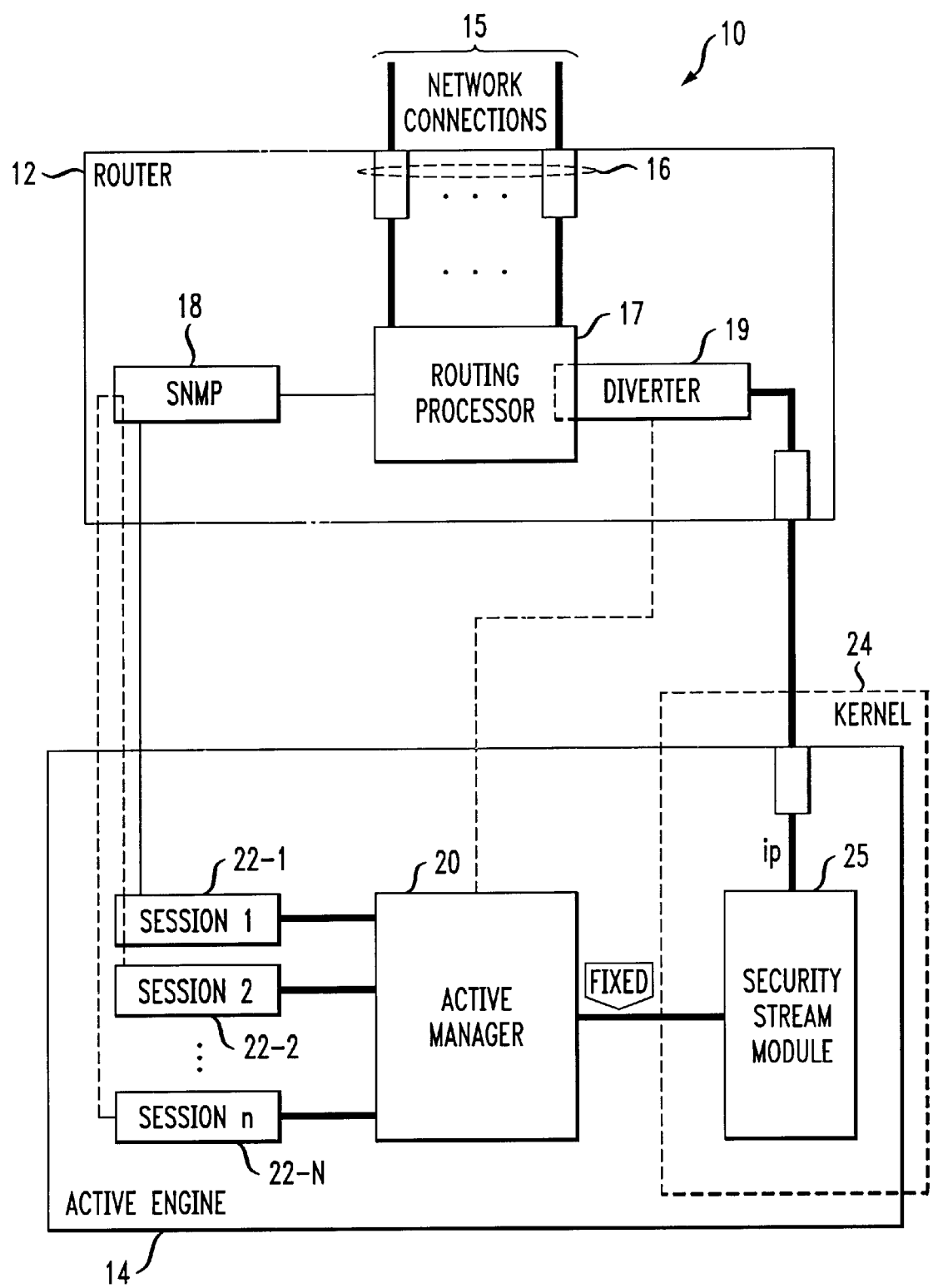
FIG. 1 shows an illustrative embodiment of a distributed network management architecture in accordance with the invention.

FIG. 1 is a block diagram of a network node 10 in the architecture of the illustrative embodiment. This embodiment will be described using active network terminology. More particularly, network node 10 will be referred to herein as an active node, packets that carry agent code and communications among agents will be referred to as active packets, and the corresponding traffic will be referred to as active traffic. In the figure, thick lines between components represent a possible flow of data, and thin lines represent a logical connection. It should be understood that the active node 10 is generally part of a larger network that includes multiple interconnected nodes, only a subset of which need be active nodes.

The active node 10 of FIG. 1 comprises a router 12 and an active engine 14. The router 12 is coupled to a communication network via network connections 15 established through ports 16. The router 12 includes a routing processor 17, a simple network management protocol (SNMP) module 18, and a diverter 19. The router 12 performs conventional IP routing functions such as forwarding, routing, and filtering. The diverter 19 detects and diverts active packets to the active engine 14, e.g., if the protocol type and port number of the packets match a designated mask. The diverter function may be implemented in hardware or software or combinations thereof, depending on the particular implementation of the router 12.

The active engine 14 is an entity which is logically separate from the router 12 and which performs certain active network operations of the active node 10. It may reside on the same computer or other machine as the router 12, or on a different machine. This structure allows a conventional off-the-shelf IP router to be upgraded to an active router simply by adding an adjunct active engine. Moreover, the separation of the router 12 from the active engine 14 protects non-active traffic from the effects of erroneous operation of the active part of the network, while imposing only minimal additional delay on non-active traffic. It also simplifies gradual deployment of active nodes in existing networks.

The active engine 14 includes an active manager 20, and supports N sessions 22-1, 22-2, . . . 22-N. Portion 24 of the active engine 14 identifies the elements associated with the active engine kernel. These elements include an IP connection with the router 12, and a security stream module 25 for providing security functions to be described in greater detail below. The active engine 14 may be viewed as an execution environment in which user-written application program code, encapsulated in active packets, can be executed with close interaction with router data and control variables. An example of an execution environment is given in, e.g., AN Working Group, "Architectural framework for active networks," Version 0.9, http://www.cc.gatech.edu/projects/canes/arch/arch-0-9.ps, Aug. 31, 1998.

Each of the sessions 22-1, 22-2, . . . 22-N represents a distributed task performed in the network. Each session has a unique network identifier, such that different programs on various nodes can belong to the same session. These programs may exchange information using active data packets, and can distribute and/or update their code by sending active programs. The session identifier allows a session to serve as a rendezvous point for data from different agents or other programs, and can support code upgrades "on-the-fly." It also supports a so-called "one-shot" capsule model by allowing a particular program to signal its termination, and to trigger a clean-up.

The active manager 20 generates the sessions, coordinates the data transfer to and from the sessions, and "cleans up" after a session when that section terminates. While a session is alive, the active manager monitors the session resource usage, and can decide to terminate the operation of a given session if that session consumes too much resources, e.g, CPU time, memory, bandwidth, etc., or if it tries to violate its action permissions.

The security stream module 25 resides in the active engine kernel below the IP output routine. Every connection that a given session wishes to open must be registered with this module in order to allow monitoring of network usage by sessions. The registration may be performed in a manner transparent to the application developer.

The SNMP module 18 is an SNMP agent implemented in the router 12. This agent serves as an interface between the router 12 and the active engine 14, allowing the sessions 22-1, 22-2, . . . 22-N of the active engine 14 to access a managed information base (MIB) of the router 12. The t MIB may include network layer data of the router, e.g., topological data such as neighbor identifiers, routing data, performance data such as packets dropped, packets forwarded, CPU usage, etc. The SNMP API in the sessions 22-1, 22-2, . . . 22-N may be implemented as a Java object that communicates with the router 12 using well-known SNMP techniques. Standard SNMP agents exist in most conventional routers and provide a read/write interface to a standard MIB. In other embodiments, performance may be enhanced by caching popular MIB objects.

Although the illustrative embodiment allows multiple languages to be implemented simultaneously, the following description will focus on an implementation for handling Java packets. Implementation of other languages may require some straightforward adaptation according to the language specifics, as will be apparent to those skilled in the art.

The flow of packets through a network including the active node 10 will now be described in greater detail. Note that a non-active packet does not pass through the active engine 14 since the diverter 19 recognizes it as such and thus the packet moves directly to its appropriate output port on the router 12.

Figure 2:
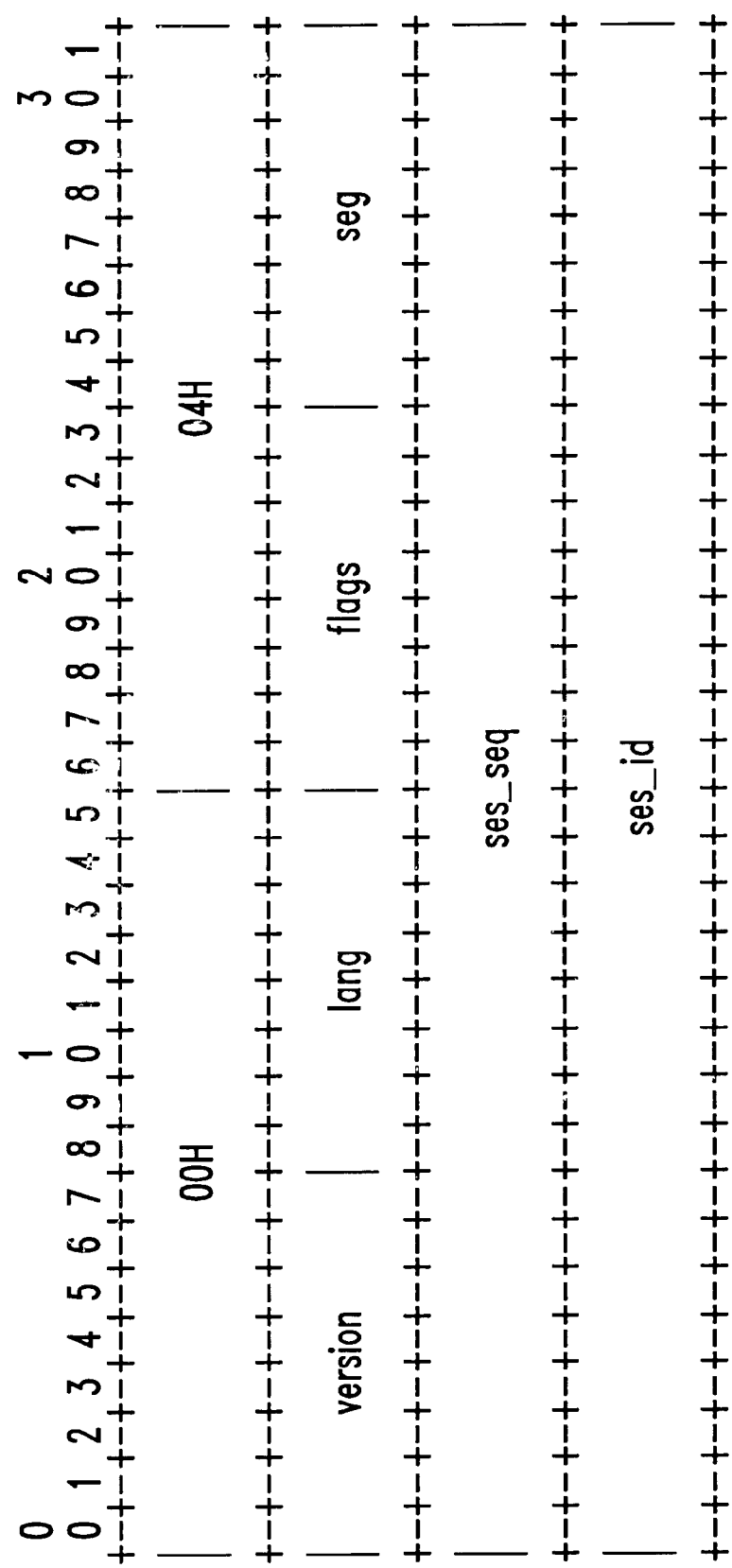
FIG. 2 shows the structure of a default option in an active network encapsulation protocol (ANEP) header used in the illustrative embodiment of FIG. 1.

All active packets in the illustrative embodiment include a default option that contains the unique session identifier of the packet, a content description, e.g., data, language, etc. FIG. 2 shows an example of the structure of the default option in an ANEP header in the illustrative embodiment. In this example, version is the software version, and lang is the language identifier. Only the most significant bit in the flags field is currently assigned to identify the last segment. The segment number is given by seg, and ses_seq and ses_id comprise the session identifier.

In operation, all the packets diverted by the diverter 19 to the active engine 14 are sent to the active manager 20. If a packet does not belong to an existing session and it contains code, it triggers a creation of a session. If it is a data packet, it is discarded. A session creation may involve, e.g., authentication, creation of a control block for the session, creation of a protected directory to store session files, opening of a private communication channel through which the session receives and sends active packets, and execution of the code.

The above-described sessions allow the corresponding programs to easily send themselves to another node, and to send and receive data. New arriving programs are passed to the sessions to allow them to perform code updates without losing state.

The illustrative embodiment includes both a blind addressing mode and an explicit addressing mode. A distinct UDP port number is assigned in this embodiment to each of these modes. The first UDP port number (3322) is the blind addressing port, which is used to send active packets to unspecified nodes in a certain direction, i.e., towards some distant destination. The diverter in the first active node that is on the route to that destination intercepts the packet and sends it to the active engine of that node. The sender is therefore not required to know the address of the next active node. This allows an active node to communicate with other active nodes in order to perform distributed tasks, without storing fall network topology information at each node. The blind addressing mode is particularly useful for functions such as topology learning, robust operation, support of heterogeneous environments, etc. The second UDP port number (3323) is an explicit active port, which is used to send an active packet to a specific active node. This packet is forwarded directly through all of the intermediate active nodes of the path, and is not diverted to an active engine until reaching its destination node.

A session that requires non-active communication with other elements of the network, such as communication using SNMP, HTTP, etc., must utilize an appropriate interface to the relevant Java objects. These interfaces transparently register the communication channel in the security stream module 25. An attempt to bypass these registrations will result in the security module 25 dropping the packets of the unregistered connection.

The active manager 20 monitors the resource consumption of the sessions in the node. This monitoring is done to avoid a situation in which a session takes a large portion of the system resources, due to an error or malicious intent. For this reason, the monitoring is done on a per-node basis and not globally. A session that consumes excessive resources is aborted.

The active manager 20 may abort a session in at least two other situations. The first is when the session does not show activity within a specified aging period. Different sessions may have varying aging periods, but none will be able to reside dormant in the CPU indefinitely. This allows "garbage collection" of unused code. A session might also ask to be aborted gracefully. The active manager 20 allows a graceful clean up of all the objects associated with such a session, especially packets that are waiting for transmission in the node.

Since it is expected in many applications that network programming will be relatively stable, one may be less concerned about program size since programs may not need to be transmitted frequently. The illustrative embodiment therefore does not attempt to optimize the capsule model. The active engine in this embodiment instead includes a mechanism to reassemble a program from a chain of up to 256 UDP packets.

The modular architecture illustrated in FIG. 1 supports interoperability, and does not require that the specific address of the next active hop is known. The diverter module 19 can be implemented using, e.g., IP filtering which is supported in the API level in most conventional routers. This architecture also allows an easy incremental deployment in heterogeneous networks. Another advantage of this architecture is robustness, i.e., non-active traffic is not affected by active traffic. More particularly, even if for some reason the active engine stops working, the router will still route non-active packets correctly.

It is apparent that the FIG. 1 architecture allows one to simultaneously run multiple distributed network management applications. A given one of the above-described sessions may be a collection of agents or other programs that are injected to the network by authorized users and executed in the active engines. The agents can migrate from node to node and can duplicate themselves. Agents belonging to the same session in different nodes can cooperate their work by exchanging data messages. Using a well-defined network layer interface, i.e., an MIB, authorized agents can gather local information and control the forwarding operation. Other software distribution mechanisms can be integrated as well, e.g., popular network management programs can be grouped into libraries that are made part of or otherwise associated with the active engine.

As previously noted, the architecture in the illustrative embodiment utilizes an active network type of framework, i.e., a framework where network elements, primarily routers and switches, are programmable, as described in, e.g., D. L. Tennenhouse et al., "A survey of active network research," IEEE Communications Magazine, 35(1):80–86, January 1997. Programs that are injected into the network are executed by the network elements to achieve higher flexibility for networking functions, such as routing, and to present new capabilities for higher layer functions by allowing data fusion in the network layer.

Additional details regarding active network techniques suitable for use in conjunction with the present invention are described in, e.g., D. Wetherall et al., "ANTS: A toolkit for building and dynamically deploying network protocols," OPENARCH'98, pp. 117–129, April 1998; A. B. Kulkarni et al., "Implementation of a prototype active network," OPENARCH'98, pp. 130–143, April 1998; D. Scott Alexander et al., "The SwitchWare active network architecture," IEEE Network, 12(4):29–36, July/August 1998; S. Bhattachaijee et al., "An architecture for active networking," HPN'97, April 1997; E. Amir, "An active service framework and its application to real-time multimedia transcoding," SIGCOMM'98, September 1998; Y. Yemini et al., "Towards programmable networks," IFIP/IEEE Intl. Workshop on Distributed Systems Operations and Management, October 1996; D. Decasper et al., "DAN: Distributed code caching for active network," INFOCOM'98, March 1998; and D. Scoff Alexander et al, "The active network encapsulation protocol (ANEP)," http://www.cis.upenn.edu/-switchware/ANEP/docs/ANEP.txt, 1997.

Safety and security are major concerns in incorporating a distributed control mechanism in a computer network. Safety implies that no application can destroy or damage the appropriate execution of other applications. In particular, the active engine as a whole should not effect the routing of non-active packets. In the architecture of the illustrative embodiment, safety is achieved by logically separating the execution environment from the forwarding mechanism, and by using a well-defined interface between them. In an embodiment in which the active engine resides on a separate machine, such that the separation not only logical but physical, the non-active data will not be affected even in the event of a crash of the active engine. It is also important in providing safety to ensure that a session will not corrupt or even access data associated with other sessions. This may be achieved in the illustrative embodiment through the use of a program such as Java Security Manager, which may be used to control the session running environment, and more particularly to prevent sessions from using native methods and to restrict the use of the file system.

Security implies that all operations including access to data are authenticated, i.e., only authorized sessions can perform actions and or access private data. The illustrative embodiment allows multiple levels of security via authentication and session classification. More specifically, each session is authorized to use specific services such as, e.g, MIB access for read or write, divert non-active packets, etc., and resources such as, e.g., CPU time, bandwidth, memory, etc. To this end, the use of use of network services and resources by sessions may be monitored. For example, tight control over the usage of communication channels to other outside-network elements via TCP connections is provided by ensuring that such connections can be only opened by a permitted session using methods that monitor the bandwidth consumption. An attempt to use conventional Java methods may be blocked by controlling the IP layer in the active engine. An unauthorized connection will be dropped. UDP packets can be sent only through the active manager, which again can monitor the bandwidth usage.

Figure 3:
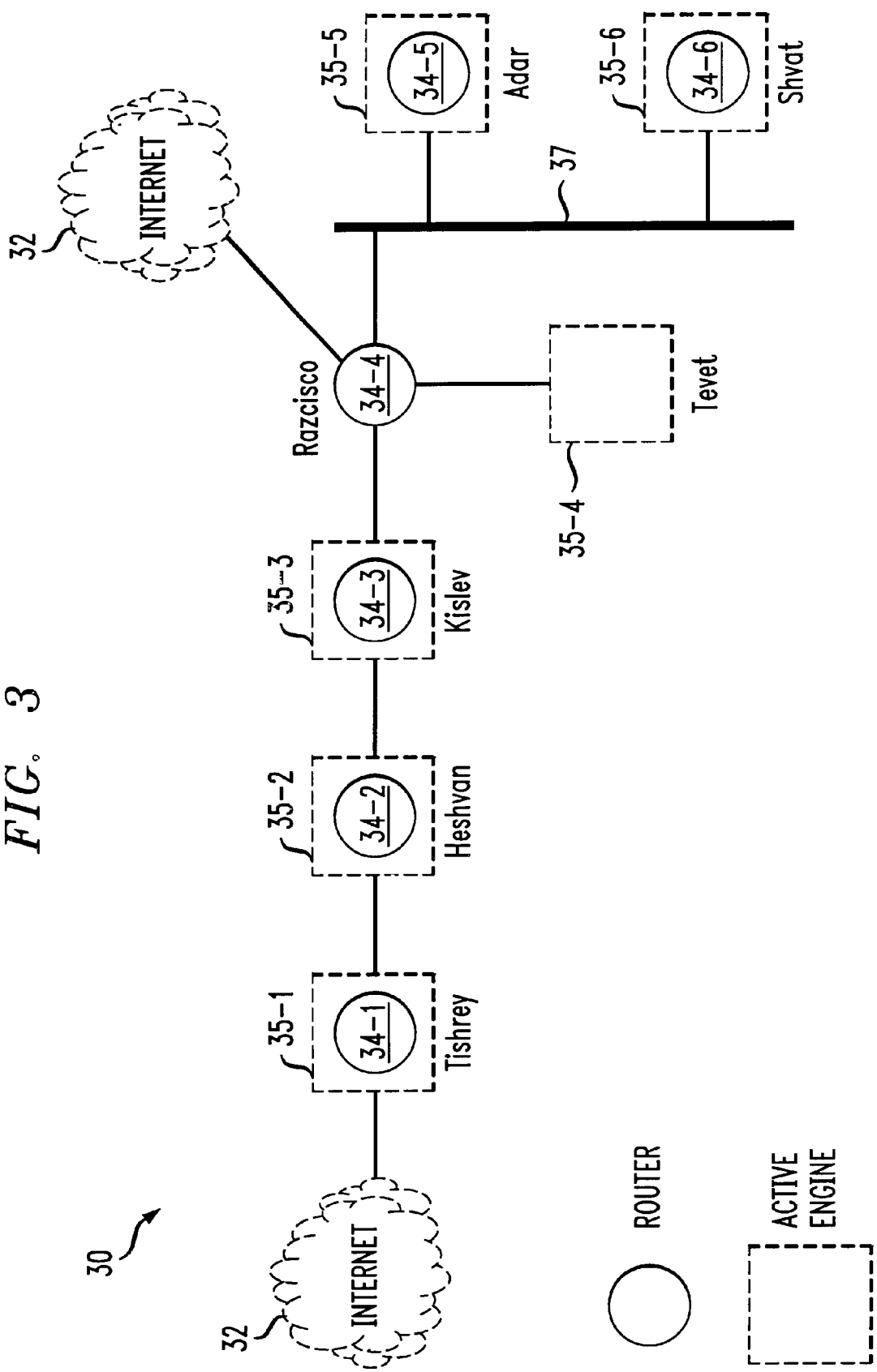
FIG. 3 is a block diagram of a simple network used to illustrate the operation of the network management architecture of FIG. 1.

FIG. 3 shows an example implementation of a small heterogeneous network 30, which illustrates the operation of the above-described architecture. The network 30 establishes connection between the Internet 32 and six active nodes. The active nodes include routers 34-1 through 34-6 associated with corresponding active engines 35-1 through 35-6, respectively. All router-engine pairs other than router-engine pair 34-4, 35-4 are implemented on common machines. Routers 34-5 and 34-6 are part of a local area network 37. The routers 34-j in this network may be implemented using, e.g., otherwise conventional FreeBSD-based active routers, Cisco 2500 routers and Lucent Technologies RABUPortMaster3 routers, or other suitable routers. The FreeBSD-based routers may be implemented as personal computers running the well-known FreeBSD operating system. The active engines 35-j are written primarily in C code, and Java is used as the programming language for the active code, although the invention can of course be implemented in and support the use of other known programming languages.

The diverter function in the routers 34-j is implemented with filters according to the active port identifier. In the FreeBSD routers, active packets may be diverted to the active engine by FreeBSD packet filter software, ipfw. In the Cisco router, the diverting may be performed using Cisco Internetwork Operating System (IOS) features. In the Lucent PortMaster router, the diverting may be performed using a tunneling feature. As previously noted, the invention can be used with other types of routers.

It should be noted that the particular configuration of network 30 as shown in FIG. 3 is an example for illustrative purposes only, and is in no way intended to limit the type of network configurations in which the invention can be implemented.

The manner in which the architecture of FIG. 1 can be used to create efficient distributed network management applications will now be described in greater detail. Two exemplary applications will be described. The first application is bottleneck detection, which is a special case of collecting information or calculating a function along a route between two nodes. The second application is message dissemination for a large group of receivers. It is useful for automatic configuration of network elements or any other application that requires dissemination of messages to a large population.

Bottleneck detection is an important problem in network management. It is a building block for higher level applications, e.g., video conferencing, that require QoS routing. It also serves as an example of a problem related to gathering of information along a given path between two network nodes.

Figures 4, 5:
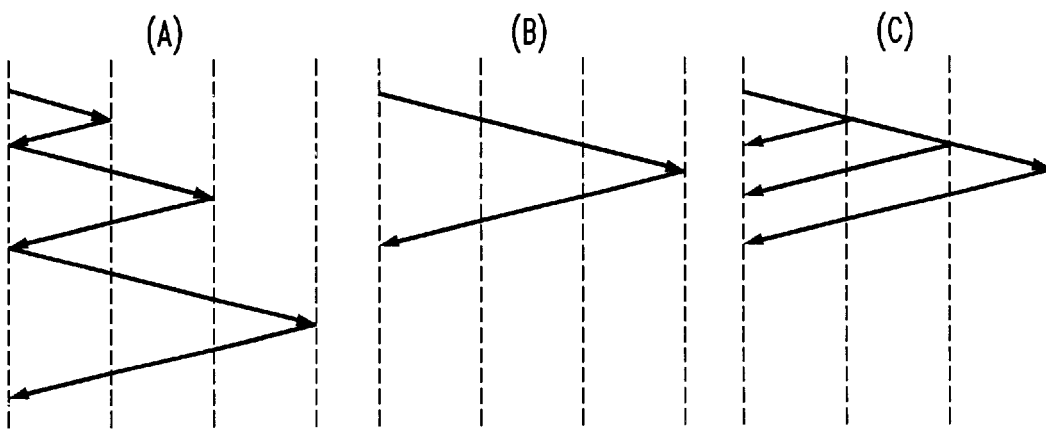
FIG. 4 shows an example of a route tracing execution from a particular one of the hosts in the FIG. 3 network.

Conventional IP networks generally provide only a single ad-hoc technique to examine one specific QoS parameter, i.e., the delay along a path. This technique is the well-known traceroute program that enables a user at a given host to get a list of all the routers on the route to another host with the elapsed time to reach them. FIG. 4 shows an example of a traceroute execution from the host tishrey in the network of FIG. 3. However, the use of the traceroute program for network management has a number of significant drawbacks. For example, it can only retrieve the hostname and the delay along a path, it is extremely inefficient in its use of network resources, and it is slow.

FIG. 5(A) illustrates the executions on an exemplary three-hop path for the above-described conventional traceroute program. FIGS. 5(B) and 5(C) illustrate the executions on the exemplary three-hop path for a collect-en-route program and a report-en-route program, respectively, in accordance with the invention. These programs provide different options for gathering information along a given path between two network nodes, and each optimizes a different objective function. Relevant parameters include communication cost, e.g., the number of hops required for a given message, and the amount of time required to perform a particular task.

As shown in FIG. 5(B), the collect-en-route program sends a single packet that will traverse the route and collect the desired information from each active node. When the packet arrives at the destination node, it sends the data back to the source, or to any suitable management station. This design minimizes the communication cost since a single packet is traveling along each link in each direction.

As shown in FIG. 5(C), the report-en-route program sends a single packet along the path. When the packet arrives at a node, it sends the required information back to the source and forwards itself to the next hop. This design minimizes the time of arrival of each part of the route information, at the expense of increased communication cost.

TABLE 1

| Algorithm Used | Communication Cost | Time of Data Arrival from Node i |
| --- | --- | --- |
| traceroute | n(n + 1) | i(i + 1) |
| collect-en-route | 2n | 2n |
| report-en-route | n(n + 3)/2 | 2i |

TABLE 1 compares the performance of the three different algorithms illustrated in FIGS. 5(A), 5(B) and 5(C). In this table, the communication cost is measured in messages times number of hops, and the time is measured in hop count. The time of data arrival assumes that the nodes along a given route are numbered 0, 1, 2, . . . n. The conventional traceroute program has time and communication complexities that are quadratic in the path length, as is apparent from FIG. 5(A). This is because a message to a node at distance i is sent only after a reply from node at distance i-1 has been received. The active network approach of the present invention reduces the time complexity because actions can be taken in intermediate nodes based on local information. As a result, both the collect-en-route and report-en-route programs have a linear time complexity. The difference between them is that in collect-en-route all the information arrives to the source together, while in report-en-route partial results are available sooner, but at the cost of an increase in message complexity.

It should be noted that the above-described programs can be configured to collect any desired data from the router, rather than just a router IP address. For example, an application programmer can query any available variable, such as an MIB variable, associated with the router. As another example, in a bottleneck detection application, statistics about TCP packet loss along a route to a certain host can be collected in order to identify the bottleneck link. In addition, the programs can be further generalized to allow a node to perform the data collection on the path between any other two active nodes in the network. This is facilitated by the two addressing modes described above. As mentioned previously, the resulting reports can be sent to any host, and that host need not be an active host.

FIG. 6 shows an example of a router identifier report generated by the implementation of the above-described report-en-route program, executed on the six-node active network of FIG. 3. Note that the reports from the FreeBSD machines are truncated due to an implementation problem of the SNMP agent in FreeBSD. The active packet that generates this report can be sent from any host as long as its path goes through an active node. The first active node, tishrey in this example, diverts the active packet to its active engine, as the packet uses the well-known active port number (3322). The packet contains the class file of the Java code shown in FIG. 7 as well as 9 bytes of data, which contain the report destination IP address, the IP address of the destination end-point of the path, and a hop count.

As the session number of this packet does not match any existing session in this node, a new session will be created using the Java code in the active packet. The packet itself is then delivered to this session as the first packet. The session reads the data from the capsule, generates a copy of the active packet to be sent towards a destination, sends a report home, and terminates. The generated copy is then intercepted by the next node on the route to the destination in which exactly the same scenario repeats itself. The reports are sent to the destination specified in the code (the report destination may be part of the data carried in the capsule), which can be different from the host that originated the application.

In the Java code of FIG. 7, session is a new instance of the class Act. The constructor takes −9 as an argument that indicates the number of data bytes in the capsule. The program and the data are then retrieved using Act methods described herein. A new active packet with the appropriate hop count is then prepared, and sent to the destination address. A report is then generated. Local information from the router is gathered using the SNMP interface. Although this embodiment uses a full MIB specification of the requested values, in other embodiments part of this interface may be overridden by a different Java interface to retrieve some of the most important information.

The following is a description of a number of functions associated with the class Act:

Act (int len)—A constructor which opens a datagram socket, and sends an op-code to the manager administration socket to announce that the session is active. The opened socket is used for all the outgoing communication to the manager. The constructor saves the program code and the initial data. The field len is optional and it indicates the amount of initial data carried with the program packet. The program packet is also referred to herein as a capsule.

public byte[ ] getProg( )—Returns the program code from the capsule. Used by a session to send itself.

public byte[ ] getInitVars ( )—Returns the initial data from the capsule.

public byte[ ] rec ( )—Used to receive a packet without the active header.

public byte[ ] recraw( )—Used to receive a packet with the active header. This method may be useful when the header information is required, e.g., for debugging.

public void send (byte[ ] m, InetAddress destAddress)—Used to send a packet m to address destAddress. The ANEP header and above-described default option are generated by the manager and are not part of the packet m.

public void killme ( )—Used to signal the manager that the session terminated and can be cleaned.

public void keepme( )—Used to signal the manager that the session is still alive.

As previously noted, the invention is not limited to collecting only node identifiers. Other embodiments could, e.g., check one or more IP counters in a router, instead of or in addition to the router name. The change in the code to implement such a change is minimal, i.e., one need only request a different MIB variable. For example, a request for .1.3.6.1.2.1.4.6.0, which is an MIB variable counting the number of IP packets forwarded by the router, results in a report such as the one shown in FIG. 8. Note that the reports in the examples of FIGS. 7 and 8 are received at inbar, which is not an active node.

It can be seen from FIG. 8 that the number of forwarded packets is increased between the two executions. The counter value is 0 for the last router, as currently only one of its interfaces is connected, and thus it does not forward any packets. Note also that the reports may arrive out of order due to the difference in response time between the SNMP servers in the machines. It is the responsibility of the application GUI to display the reported information in a format convenient for the user.

The other example application to be described herein is message dissemination. In many network management applications there is a need to deliver a message to an ad-hoc group of machines. For example, using an autoconfiguration application, a group of routers might need to be reconfigured due to a change in the network. As another example, a monitoring application may periodically query all the hosts it did not hear from in the last period. In yet another example, a security application might collect information from a group of routers based on the attack pattern it suspects.

In these and other similar applications, the machine group is ad-hoc defined for the purpose of dissemination of a single message, in contrast to being defined as a long-lasting group as in multicast applications. Since the group is defined by the recipient list of a single message, it is not efficient to form a multicast group or to invest in any other long-term infrastructure. Without the active network approach described herein, such a message dissemination to a large group of receivers would generally be implemented by either sending a unicast message to each receiver, or by broadcasting the message to the entire network.

It is assumed in this example that a message is comprised of a header with a list of receivers, and a body which, for a large group of receivers, is much smaller than the header. One may make use of the fact that the union of all the routes from the originator to the receivers is a directed tree rooted at the originator. This tree is referred to herein as a dissemination tree. For purposes of simplification and clarity of illustration, it will be assumed that the dissemination tree is a binary balanced tree with the receivers at the leaves, as shown in FIG. 9.

The active network approach to the message dissemination application involves partitioning the receiver list at the source according to the first hop on the path to each receiver. This partitioning is continued at every intermediate node until the message arrives at the tree leaves. In this manner, exactly one copy of the message traverses each link in the dissemination tree. For a balanced binary tree with n leaves, the message complexity is 2n, while the above-noted unicast solution has a message complexity of n log n.

In each active node, a possibly large list of addresses may need to be partitioned. This requires more processing at each node than in the bottleneck detection example. In fact, the processing time will be linear in the receiver list length, since the next hop of every receiver needs to be checked. This requires access to the routing table at the router, which is provided in the architecture described above.

The time it takes the algorithm to deliver the message to all the destinations depends both on the delay along the links, and the delay due to the processing in the nodes. The link delay contribution is the same for both solutions since the IP routing is not changed. If the message is distributed using the unicast approach, O(n) processing cycles are required at the sender. On the other hand, the above-described active network approach partitions the address list in each intermediate node. The delay due to this active network approach is about twice that of the unicast approach, since at every level of the tree the address list is halved. Nonetheless, the address dissemination example serves to illustrate the manner in which an active network approach can be used to trade off delay and network utilization. In this example, the active network approach achieves a logarithmic improvement in utilization at the cost of only a constant factor in delay.

The above-described active network approach may be used in numerous other applications, such as, e.g., adaptive control, router configuration, element detection, and network mapping. The active network approach is also well suited for use in security management applications such as, e.g., intruder detection, fighting denial of service attacks, etc. The active network approach can also be used to support solutions to other problems that are not necessarily considered part of network management, such as, e.g., search mechanisms, smart mail, multicasting, hop-to-hop flow control, etc.

As noted previously, the present invention provides an active network approach to distributed network management that simplifies deployment of distributed network management applications. The approach provides a number of advantages over conventional network management approaches, including the following advantages:

1. Generality and simplicity. The active network approach of the invention is not be limited to one language, and supports languages that are in general use. A given node of the network is general enough to support both long-term and short-term applications.

2. Modularity. In accordance with the invention, a network node is separated into router and active engine modules with a clearly-defined interface between them. More particularly, in the illustrative embodiment, the forwarding mechanism of a router is separated from the operating environment where the active packets are executed. The invention also utilizes well-accepted standards, such as Java, SNMP, and the above-noted active network encapsulation protocol (ANEP), as the API in which the router and active engine modules exchange information.

3. Interoperability and heterogeneity. In many applications, active nodes will co-exist with non-active node. Furthermore, incremental deployment of active nodes with co-existing conventional routers is a natural evolution path. In such a scenario, it is unlikely that an application running on an active node could explicitly know the addresses of its other active neighbors. To this end, the invention supports blind addressing, in which the active node need not know the specific address or the location of other active nodes.

4. Application life span. In many network management applications, e.g., monitoring and billing, there is a natural need for an application to reside in a node for a long period of time. The active network approach of the invention supports such applications, as well as tasks having a short life span.

5. Network layer interface. The active network approach allows an application to have easy and standard access to the local information at a node, since in many applications the action taken by the packet depends on this information. This access supports read and write operations, thereby allowing the application to take corrective actions.

6. Cost visibility. The active network approach of the invention allows applications to be aware of costs, both in terms of node resources such as CPU, memory, etc., and in terms of global network resources such as bandwidth and delay. Advanced distributed tools, such as CORBA and Java RMI, which in general hide much of the actual costs from the user, are not required.

7. Safety and security. The invention supports additional functionality without affecting legacy network operation, and can be configured to prevent unauthorized network management applications from affecting any other application.

As previously noted, the above-described embodiments of the invention are illustrative only. Alternative embodiments may be implemented in other types of computer networks, using hardware and software configurations other than those specifically described herein. These and numerous other alternative embodiments within the scope of the following claims will be readily apparent to those skilled in the art.

What is claimed is:

1. An apparatus for use in implementing a distributed network management function in a network, the apparatus comprising:
    a network node having associated therewith a router and a processing engine, wherein the router is operative to divert designated packets relating to the distributed network management function to the processing engine, and the processing engine supports one or more sessions, based at least in part on the designated packets, for implementing at least a portion of the network management function.

2. The apparatus of claim 1 wherein the network includes a plurality of network nodes, with each of at least a subset of the network nodes including the router and processing engine.

3. The apparatus of claim 2 wherein each of at least a subset of the network nodes comprises a computer.

4. The apparatus of claim 2 wherein at a given one of the network nodes the router and the processing engine reside on the same machine.

5. The apparatus of claim 2 wherein at a given one of the network nodes the router and the processing engine reside on different machines.

6. The apparatus of claim 1 wherein the processing engine supports a plurality of sessions, each corresponding to a distributed task to be performed in the network.

7. The apparatus of claim 6 wherein each of the sessions has associated therewith a unique network identifier, such that different programs on different network nodes can belong to the same session.

8. The apparatus of claim 1 wherein the router supports a blind addressing mode which is used to send designated packets from the network node via unspecified network nodes in a particular direction toward a destination node, such that a router in a first unspecified node along a route to the destination node intercepts the packet and sends it to an associated processing engine of that node.

9. The apparatus of claim 1 wherein the network management function comprises a program that sends at least one packet to traverse a route through the network from a source node to a destination node and collect specified information from each node along the route, wherein when the packet arrives at the destination node, it sends the specified information back to the source node.

10. The apparatus of claim 1 wherein the network management function comprises a program that sends at least one packet to traverse a route through the network from a source node to a destination node and collect specified information from each node along the route, wherein when the packet arrives at a given node along the route, it sends the specified information back to the source node, and forwards itself to the next node along the route.

11. The apparatus of claim 1 wherein the network management function comprises a message dissemination application in which a message is to be directed from a source node to each of a plurality of destination nodes, such that the union of all the routes from the source node to the destination nodes may be represented as a directed tree rooted at the source node.

12. The apparatus of claim 11 wherein a list of the destination nodes is partitioned at the source node in accordance with a first hop on the path to each of the destination nodes, and this partitioning is continued at each intermediate node between the source and destination nodes until the message arrives at each of the destination nodes, such that a single copy of the message traverses each link in the directed tree.

13. A method for implementing a distributed network management function in a network, the method comprising the steps of:
    configuring a network node to include a router and a processing engine;
    diverting designated packets relating to the distributed network management function from the router to the processing engine; and
    maintaining one or more sessions in the processing engine, based at least in part on the designated packets, for implementing at least a portion of the network management function.

14. An article of manufacture comprising a machine-readable storage medium for storing one or more software programs for implementing a distributed network management function in a network, wherein the one or more software programs when executed implement the steps of:

configuring a node of the network to include a router and a processing engine;

diverting designated packets relating to the distributed network management function from the router to the processing engine; and maintaining one or more sessions in the processing engine, based at least in part on the designated packets, for implementing at least a portion of the network management function.

15. A network comprising:

a plurality of nodes, each of at least a subset of the nodes including a router and a processing engine, wherein the router in a given one of the nodes is operative to divert designated packets relating to a distributed network management function to the processing engine of the given node, and the processing engine supports one or more sessions, based at least in part on the designated packets, for implementing at least a portion of the network management function in the given node.

* * * * *